Nov. 25, 1924.
W. B. FLOYD
1,516,634
CAR WHEEL MOUNTING
Filed July 11, 1921   2 Sheets-Sheet 1
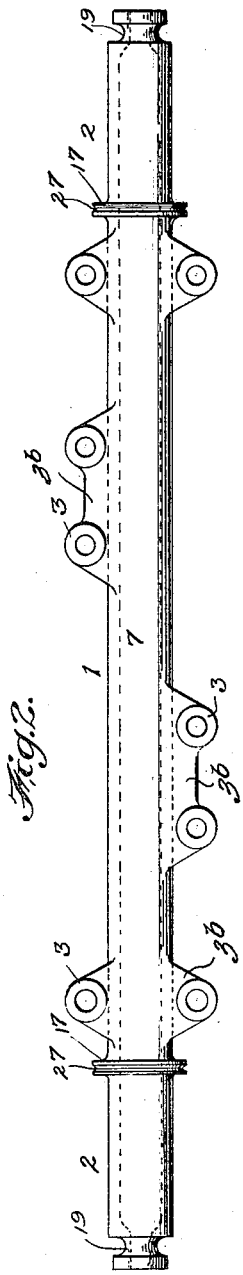
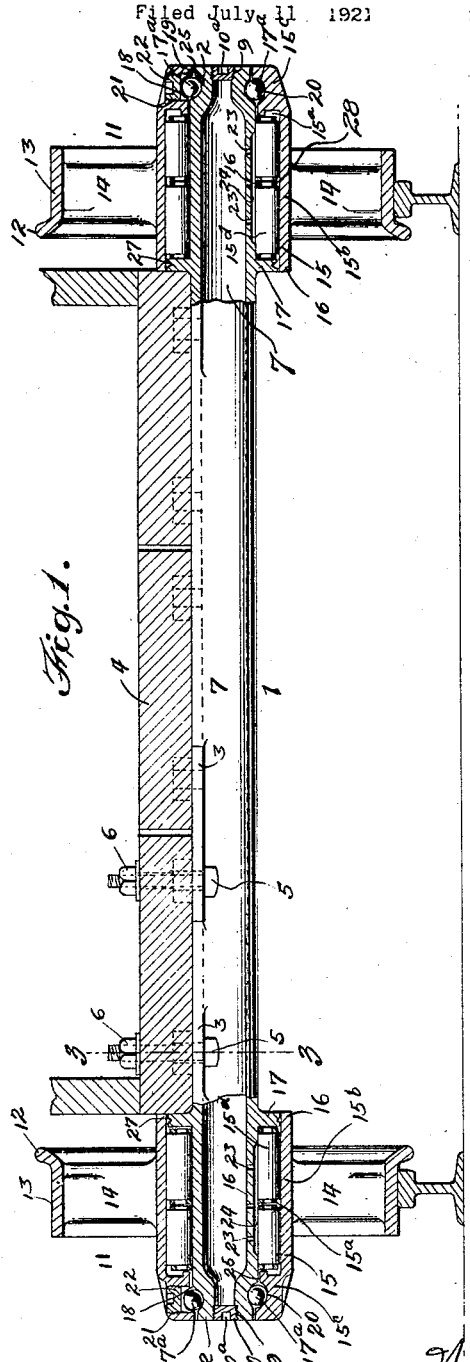
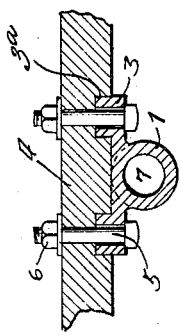
Inventor
Walter B. Floyd
By H. H. Bliss
Attorney

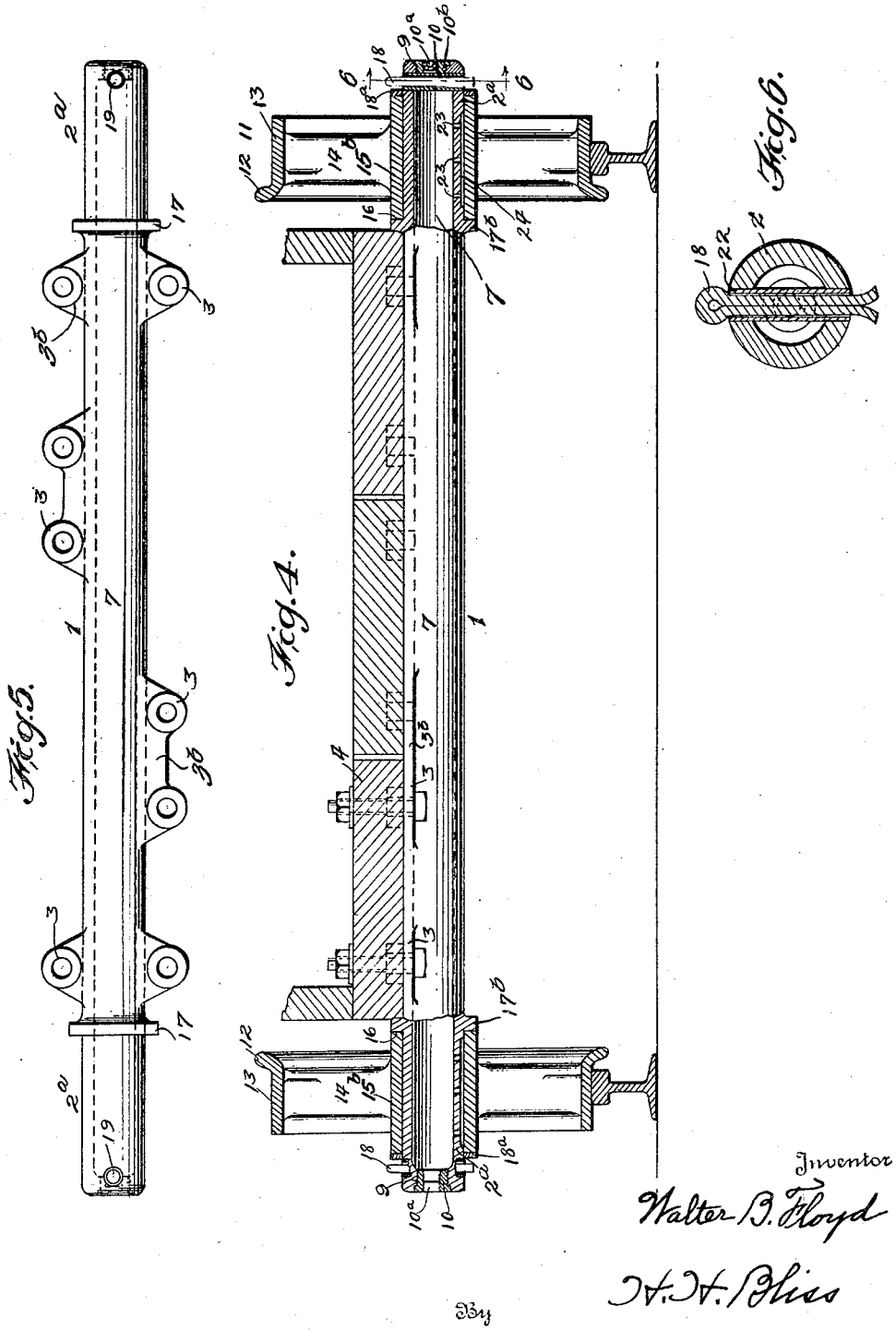

Patented Nov. 25, 1924.

1,516,634

UNITED STATES PATENT OFFICE.

WALTER B. FLOYD, OF COLUMBUS, OHIO, ASSIGNOR TO THE BONNEY-FLOYD COMPANY, OF COLUMBUS, OHIO, A CORPORATION OF OHIO.

CAR-WHEEL MOUNTING.

Application filed July 11, 1921. Serial No. 483,856.

*To all whom it may concern:*

Be it known that I, WALTER B. FLOYD, a citizen of the United States, residing at Columbus, in the county of Franklin and State of Ohio, have invented certain new and useful Improvements in Car-Wheel Mountings, of which the following is a specification, reference being had therein to the accompanying drawing.

This invention relates to improvements in axles for vehicles and particularly axles intended for supporting the wheels of mine, or industrial cars. The axles are usually solid bars secured to the car bodies, and the wheels are mounted upon spindles secured to, or formed integrally with, the body parts of the axles. The devices by which they have been fastened in place are of an inferior nature, such as strap irons, or widely separated boxes secured to the bottom corners of the car.

The main object of this invention is to provide an axle structure suitable for mine cars and industrial cars of any of the various sorts which is provided within itself or upon itself, as an entirety, with all the necessary means for attaching the wheels to the axle; and for fixing the axle to the car or truck body; and provided with a reservoir holding a relatively large quantity of lubricant for the anti-friction bearing.

Between the collars of the axle are the bosses which are webbed to the axle, with the webs coming flush with the top of the axle. Upon these extended webs are placed the bosses which protrude into the bottom boards of the car body. These webs or shelves may be placed opposite each other or may be staggered. These expanded fastening plates or webs take the place of channels, large plates, axle boxes, straps, etc., which are placed on the ordinary axle in order to attach it to the car body and distribute the load evenly over the axle. The bosses which extend into the floor boards help to hold the axle against any torsional displacement as well as to hold the wheels in exact alignment.

Due to the axle being hollow a means has been provided to hold the wheel on the spindle. This is done by drilling a hole through the axle near the end of the spindle and tightly fitting a tube in apertures in the wall of the axle, this tube extending across the oil chamber and through it is passed the cotter pin or bolt.

Another object of this invention is to provide an axle which will within itself have a large reservoir capable of holding a large amount of lubricating liquid, together with a means for distributing this lubricant to the bearing surfaces, which require constant lubrication. This oil is held in the reservoir by the following method. A bushing is cast integral with the axle and either a pipe plug or spring oiling valve is screwed into the bushing, so that the oil can be inserted into the reservoir from either end of the axle.

The merits of the above described cast hollow steel axle are clearly brought out in the accompanying drawings and described in the following specification.

In the drawings:

Fig. 1 is a view of the bottom part of a car and of an axle, embodying my improvements, some of the parts being shown in section, and the wheels being also illustrated.

Fig. 2 is a plan view of the axle.

Fig. 3 is a vertical section on the line 3—3 of Fig. 1.

Fig. 4 is a view similar to Fig. 1 showing a car and axle of modified form.

Fig. 5 is a plan view of the axle shown in Fig. 4.

Fig. 6 is a vertical section on the line 6—6 of Fig. 4.

The axle in Figs. 1 and 2 is a steel casting and, as an entirety, comprises the central part 1 and the spindles 2—2, one at each end, and integral with said part 1. 3—3 are apertured lugs cast integral with the part 1 and adapted to be seated in sockets 3ª in the lower surface part of the planks of the bottom 4 of the car body when the axle is in proper position. The axle and body are secured together with bolts 5 and nuts 6. The lugs 3, 3 are arranged over a relatively wide base, they being carried by plates or flanges 3ᵇ, cast with the axle and extending laterally therefrom. These lugs when tightly seated in the bottom planks and clamped by the bolts give a strong and rigid fastening for the axle, the bracing points being in a practically continuous series extending from end to end of the axle across the bottom.

The axle is cast also with the flanges or collars 17, to serve as wheel abutments, as bracing flanges fitted against the side of the car bottom, and as closures for the chambers in the wheel hubs.

The central or body part 1 and the spindle parts 2 of the axle are cored at the time of casting so that they are made tubular throughout, a chamber or reservoir 7 being provided which extends from end to end. This reservoir 7 is adapted to hold a large quantity of lubricant such as is required at the bearing surfaces of the spindle and of the wheels carried thereby.

The ends of the chamber may, at the time when the axle is cast, be left entirely open and be subsequently closed, more or less, by the insertion of suitable closures; or, preferably, they may be partially closed at the time of casting, openings being left for the core prints. The edges of the inwardly turned cast metal around the openings are threaded, as at 9, and in these openings are fitted the threaded plugs 10; the latter being countersunk in their outer ends as at $10^a$, to receive wrench heads or tools. By providing openings at both ends of the tubular axle the reservoir 7 can be filled from either end, a feature of importance in vehicles of this class.

11, 11 are wheels which may be of an ordinary sort, each comprising a flange 12, the tread 13, the web or spokes 14 and hub 15. When a wheel is in operative position, on the axle, its hub 15 is fitted on the spindle 2 and its inner edges 16 are adjacent to the collar 17 above described. The hub of the wheel may be solid. Preferably it is formed with chamber $15^a$ inside of the cylindrical part $15^b$ (integral with spokes 14); the cylindrical part having an annular wall $15^c$, integral with it, and extending in to the outer surface of the spindle 2. In the chamber $15^a$ are mounted anti-friction bearing rollers $15^d$ together with their cage rings 28.

The wheels 11 are held against lateral movement on the axle by the balls $17^a$ which roll in the race 18. This race is formed in two parts; the inner part 19 being one half of a circular groove formed in the metal of the spindle 2, and the other part 20 being a part of a similar groove on the inner face of the hub part 15 of the wheels. At 21 an aperture is provided through the metal of the hub 15 to permit the insertion of the balls $17^a$ after the wheel has been positioned on the axle. The metal of the spindle is at $15^e$ relatively thick to allow the forming of the groove 19 for the balls. 22 is a pipe plug with a countersunk head adapted to be fitted tightly in the aperture 21 after the balls of the thrust bearing have been placed in the races.

23, 23 are ducts or oil holes through the wall of the spindle 2 leading from the reservoir 7 to oil pockets 24 which are formed in the bearing surface of each of the spindles 2. By means of these oil holes the lubricant is distributed to the bearing surfaces of the hub, the rollers, and the spindle. Lubricant is taken from the roller bearing chamber to the ball race 18 through the interstices 25 between the inward projecting parts $15^c$ of the hub 15 and the outer surfaces of the spindle 2.

The collars or flanges 17 are formed with oil seal grooves 27. The inner end of each hub 15 overlaps the periphery of a collar 17 preventing the escape of lubricant from the roller bearing chamber. The parts are so constructed and assembled that a minimum amount of clearance is obtained between the hub 15 and the spindle 2 at the extreme end of the axle.

In Figs. 4, 5 and 6 I have shown the axle as made with modified details at the points where the wheels are attached. The central part 1, the flanges $3^b$ and the sockets 3 are similar to the corresponding parts in the construction above described. A large lubricant receptacle 7 is formed also in the same way, that is by casting the central part 1 and the spindle parts $2^a$—$2^a$ with a chamber extending from end to end of the axle.

In this case a wheel of the common character is used having a plain hub $15^b$ at the inner ends of the spokes 14. This hub at its inner edge 16 bears against a flange or collar $17^b$ integral with the axle and similar to that at 17 in Figs. 1 and 2 except that it does not have the peripheral groove, the end 16 of the hub bearing laterally directly against it.

At the outer end of the wheel hub 15 there is a washer $18^a$ which is held in place by a retainer 18 engaging with the axle. In this construction (Figs. 4, 5 and 6) the metal at each end of the axle is shaped somewhat differently from that in Fig. 1. A larger opening at the end of the spindle is formed but a screw-threaded filler $10^b$ is inserted, and this in turn has a central opening into which is inserted a plug 10 with wrench socket $10^a$.

22 is a tube or bushing fitted tightly in apertures in the wall of the axle, this tube extending across the oil chamber and through it is passed the cotter pin or fastener 18. The bushing prevents the escape of lubricant through the apertures in the spindle metal. The spindle wall here also has passages 23, 23, for the oil, leading to the bearing surfaces of the spindle and wheel hub.

I am aware, as above stated, that devices have been made, or proposed, wherein a reservoir for lubricant was provided in the spindle part of the axle, or provided in one or more pockets formed in the metal of the wheel. Such devices, however, require to be frequently filled because of the impossibility to provide a large reservoir or chamber either in the wheel or in the spindle. And large reservoirs, on the one hand, or frequent fillings of small chambers on the other hand, are necessary, especially where there is any chance for the lubricant to escape because of faulty fitting of the wheels upon the spindles.

But with an axle structure or wheel mounting such as I have designed, the large central part is utilized for the storage and distribution of the lubricant, and one filling of its reservoir will serve to lubricate the bearing surfaces of the spindles and the wheels for a long time. This central part is not restricted in its cross-sectional dimensions, as is the spindle (which carries the wheel and cannot be enlarged beyond close limits), but can be considerably enlarged, transversely, as required.

The possibility of introducing a supply of oil at one side of the car which is immediately delivered to the wheels on both sides, is a matter of great importance in cars which are used in restricted spaces in mines. The wheels of any pair, or all of the wheels on both sides of the entire train, can be supplied with lubricant by an operator walking along one side, only, of the train; as in the case of each axle the lubricant passes from end to end through the chambered central part. The lubricating of one wheel of a pair causes the lubricating of both.

What I claim is:

1. As an article of manufacture a hollow axle for a car having its bore extending from end to end thereof to form a lubricant reservoir, integral wheel spindles formed on said axle and provided with lubricant delivery openings communicating with said bore, and integral securing lugs extending outwardly from the body of the axle between said spindles.

2. As an article of manufacture a hollow axle for a car having its bore extending from end to end thereof to form a lubricant reservoir, integral wheel spindles formed on said axle and provided with lubricant delivery openings communicating with said bore, and integral securing lugs extending outwardly from the body of the axle between said spindles, said lugs carrying bosses adapted to extend into the bottom of a car body.

3. As an article of manufacture a hollow axle for a car having its bore open at the axle ends and extending from end to end of the axle to form a lubricant reservoir, integral wheel spindles cast on said axle and provided with radial lubricant delivery openings communicating with said bore, and integral securing lugs extending outwardly from the body of the axle on opposite sides thereof.

4. As an article of manufacture a hollow axle for a car having its bore open at the axle ends and extending from end to end of the axle to form a lubricant reservoir, integral wheel spindles cast on said axle and provided with radial lubricant delivery openings communicating with said bore, and integral securing lugs extending outwardly from the body of the axle on opposite sides thereof, said lugs carrying bosses adapted to extend into the bottom of a car body.

5. As an article of manufacture a hollow axle for a car having its bore extending from end to end of the axle to form a lubricant reservoir, and open at the ends thereof, closure means for the ends of said axle, integral wheel spindles on said axle provided with radial lubricant delivery openings communicating with said bore, and integral body attaching lugs extending outwardly from the portion of the axle between said spindles and carrying bosses adapted to extend into the bottom of the car body.

6. A hollow axle for a car having its bore extending throughout the entire length thereof to form a lubricant reservoir, integral spindles formed at the ends of the axle, and integral body attaching means formed on the axle between said spindles.

7. A hollow axle for a car having its bore extending throughout the entire length thereof to form a lubricant reservoir, integral spindles formed at the ends of the axle and having lubricant reservoir openings communicating with said bore, and integral body attaching means formed on the axle between said spindles.

8. A hollow axle for a car having its bore extending throughout the entire length thereof to form a lubricant reservoir, integral spindles formed at the ends of the axle, and integral body attaching means formed on the axle between said spindles, said means including bosses adapted to fit into a car body, and means for delivering lubricant from said reservoir to the spindles.

9. As an article of manufacture an axle for a car hollow from end to end, whereby the same may serve as a lubricant chamber, integral spindles cast at the ends of said axle, integral body attaching means cast thereon between said spindles, the spindles having extending therethrough openings adapted to receive a cotter pin or the like, means to deliver lubricant from said chamber to the spindles and means closing off said openings from the interior of the axle to prevent the escape of lubricant when a cotter pin is inserted.

10. As an article of manufacture an axle for a car hollow from end to end, whereby the same may serve as a lubricant chamber, integral spindles cast at the ends of said axle, integral body attaching means cast thereon between said spindles, said means including bosses adapted to fit into the bottom of a car body, the spindles having extending therethrough openings adapted to receive a cotter pin or the like, means to deliver lubricant from said chamber to the spindles and means closing off said openings from the interior of the axle to prevent the escape of lubricant when a cotter pin is inserted.

11. As an article of manufacture, an axle for a car hollow to contain lubricant and formed with integral spindles at its ends, said axle being constructed to deliver lubricant to said spindles, and integral body attaching means extending outwardly therefrom between the spindles.

12. As an article of manufacture, an axle for a car hollow to contain lubricant and formed with integral spindles at its ends, said axle being constructed to deliver lubricant to said spindles and integral body attaching means extending outwardly therefrom between the spindles, said body attaching means being positioned on opposite sides of the axle body.

13. As an article of manufacture, an axle for a car formed with integral hollow spnidles at its ends, said axle being formed between the spindles to contain lubricant and constructed to deliver lubricant therefrom to the interior of said spindles, and integral body attaching means extending outwardly from the axle between the spindles.

In testimony whereof, I affix my signature.

WALTER B. FLOYD.